United States Patent Office 3,377,374
Patented Apr. 9, 1968

3,377,374
4-(AMINOMETHYL)CYCLOHEXANE-CARBONITRILE
Chapman M. Hale, Jr., Vada L. Brown, Jr., and Theodore E. Stanin, Kingsport, Tenn., assignors to Eastman Kodak Company, Rochester, N.Y., a corporation of New Jersey
No Drawing. Filed July 17, 1964, Ser. No. 388,740
1 Claim. (Cl. 260—464)

ABSTRACT OF THE DISCLOSURE

The process which comprises preparing 4-(aminoethyl)cyclohexanecarbonitrile, 1,4 - cyclohexanebis(methylamine), and 3-azabicyclo[3.2.2]nonane by the catalytic hydrogenation of 1,4-cyclohexanedicarbonitrile.

---

This invention relates to a novel chemical process and to a novel compound produced thereby. More particularly, this invention relates to a process for preparing 4-(aminomethyl)cyclohexanecarbonitrile; 1,4 - cyclohexanebis(methylamine) or 3 - azabicyclo[3.2.2]nonane by subjecting cyclohexanedicarbonitrile to catalytic hydrogenation and to the novel compound 4-(aminomethyl)cyclohexanecarbonitrile.

Our invention accordingly has as one of its objects the production of the novel compound 4-(aminomethyl)cyclohexanecarbonitrile.

One of the principal objects of the present invention is to provide a novel process for the production of 3-azabicyclo[3.2.2]nonane; 4-(aminomethyl)cyclohexanecarbonitrile or 1,4-cyclohexanebis(methylamine).

A further object is to provide a catalytic process for the production of 3-azabicyclo[3.2.2]nonane, 4-(aminomethyl)cyclohexanecarbonitrile, or 1,4-cyclohexanebis-(methylamine) which can be carried out in either a batch or a continuous manner.

Other objects will appear hereinafter.

These objects are accomplished by the following invention which is based upon the discovery that if one reacts 1,4-cyclohexanedicarbonitrile with hydrogen in the presence of a suitable hydrogenation catalyst, with or without ammonia being present, one can obtain 3-azabicyclo[3.2.2]nonane, 4-(aminomethyl)cyclohexanecarbonitrile, or 1,4-cyclohexanebis(methylamine) directly in accordance with the following equation:

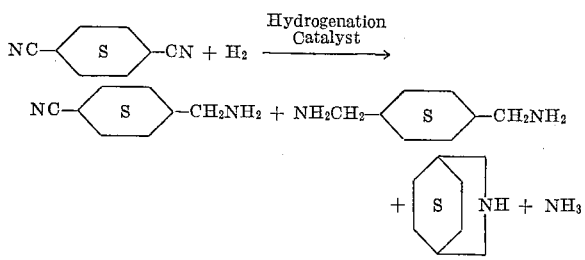

The reaction may be carried out in either a batchwise or a continuous manner. In either case, a suitable pressure vessel is employed. Such a vessel is equipped with a suitable means for the introduction of hydrogen and, in case ammonia is employed, is also provided with suitable means for the introduction of ammonia. In operating in a batchwise manner, the hydrogenation catalyst is charged to the pressure vessel in any suitable physical form, for example, a solvent-wetted powder. When operating in a continuous manner, the catalyst will generally be charged in pellet form.

Any suitable hydrogenation catalyst can be employed for the reduction reaction to produce 4-(aminomethyl)cyclohexanecarbonitrile or 1,4 - cyclohexanebis(methylamine). Several such catalysts which have been found to be particularly effective in carrying out our process are Raney cobalt, Raney nickel, a catalyst composition sold under the trade name Girdler G–67 (containing 60 percent cobalt on a kieselguhr support and a zirconium promoter) and a catalyst sold under the trade name Girdler G–49A (containing 65 percent nickel on a kieselguhr support). Catalysts of high surface area containing cobalt or nickel are useful if 3-azabicyclo[3.2.2]nonane is desired.

Whether operating batchwise or in a continuous manner the reaction vessel will be provided with a suitable heating means which may take the form of an electrical resistance unit, a circulating hot oil system or other suitable means. The temperature in either case is maintained within the range of 90° C. to 200° C., and preferably within the range of 100 to 180° C. In either method of operation, the pressure is maintained within the range of 500 to 3000 p.s.i. and preferably within the range of 1000 to 2000 p.s.i.

The reaction products can be separated from the reaction mixture by fractional distillation at atmospheric or reduced pressures. It is often more convenient to remove the 3-azabicyclo[3.2.2]nonane first at atmospheric pressure and then to separate other products at reduced pressure, as desired.

Reference has been made above to the fact that one can operate our novel process with or without ammonia being present. In some cases it is desirable to employ ammonia since this reduces the formation of by-product poly(secondary amines). Where this is desirable, then use of ammonia is advantageous. However, ammonia may be omitted to improve the yields of 3-azabicyclo[3.2.2]nonane, since the addition of ammonia would tend to suppress formation of the latter.

The reaction conditions chosen will depend upon which of the products of the reaction are most highly desired. For example, the maximum yield of 4-(aminomethyl)cyclohexanecarbonitrile is achieved by conducting the reaction in the presence of ammonia for a relatively short reaction time at a relatively low pressure within the stated range. The production of 1,4-cyclohexanebis(methylamine) is favored by relatively higher pressures within the stated range, relatively longer reaction times and the presence of ammonia whereas the production of 3-azabicyclo[3.2.2]nonane is favored by relatively long reaction times, relatively low pressure within the stated range and the absence of ammonia.

In the following examples and description we have set forth several of the preferred embodiments of our invention but they are included merely for purposes of illustration and not as a limitation thereof.

EXAMPLE I

The process of the invention was conducted batchwise by the following procedure: to a one-liter stainless steel rocking autoclave was charged 20 g. 1,4-cyclohexanedicarbonitrile, 200 cc. of dioxane and 0.5 g. of Raney cobalt. The reaction mixture was then reduced at 1500 p.s.i. hydrogen pressure at 125° C. Hydrogenation was continued for one hour after hydrogen adsorption stopped. Analysis of the reaction mixture indicated the following:

|  | Percent |
|---|---|
| (1) 3-azabicyclo[3.2.2]nonane | 6.3 |
| (2) Unknown | 12.3 |
| (3) 1,4-cyclohexanebis(methylamine) | 19.8 |
| (4) 4-(aminomethyl)cyclohexanecarbonitrile | 61.9 |

EXAMPLE II

The process of the invention was carried out as a continuous process as follows: the reaction was conducted in a pressure vessel of 870 cc. internal volume charged with 3.2 lb. of a catalyst sold under the trade name of Girdler G–67 which is a pelleted composition containing 60 percent cobalt on a kieselguhr support and a zirconium promoter and having a pellet size of 3/16" x 1/8". The reactor system was equipped with a means of temperature control and a means for pumping the liquid reactants through the catalyst bed under pressure and for admission of ammonia and hydrogen gas under pressure. The system was also equipped with a means for recycling a portion of the product.

A 20 percent solution of 1,4-cyclohexanedicarbonitrile in n-butanol was pumped through the reactor at the rate of 60 cc./min.; liquid ammonia was pumped through at the rate of 20 cc./min. and hydrogen was admitted from a compressor to maintain the pressure in the reactor at 1500 p.s.i. at 160° C. About 75 percent of the product stream issuing through the discharge valve of the pressure vessel was recycled to the reactor. Under these conditions, the product at steady state was composed of 6.6 percent 3-azabicyclo[3.2.2]nonane. 83.6 percent 1,4-cyclohexanebis(methylamine), 9.5 percent 4-(aminomethyl)cyclohexanecarbonitrile, 0.3 percent 1,4-cyclohexanedicarbonitrile. The rate of feeding the 1,4-cyclohexanedicarbonitrile solution will affect the residence time in the reactor and thus the composition of the product. As previously stated, higher residence times will favor higher 3-azabicyclo[3.2.2.]nonane and 1,4-cyclohexanebis(methylamine) content. The selection of the reaction conditions in accordance with the principles previously discussed will depend upon the relative amounts of azabicyclononane, cyclohexanebis(methylamine), and 4-(aminomethyl)cyclohexanecarbonitrile that are desired. The following table illustrates the effect of changing temperature and pressure on the compositions of the product. Run number 5 in the table below was conducted at a relatively higher feed rate and, therefore, relatively lower reaction time than run number 4.

| Run | Pressure, p.s.i. | Temp., ° C. | Percent 1,4-cyclohexanebis(methylamine) | Percent 4-(aminomethyl)-cyclohexane-carbonitrile | Percent 3-aza-bicyclo[3.2.2]-nonane | Percent 1,4-cyclohexanedi-carbonitrile |
|---|---|---|---|---|---|---|
| 1[2a] | 1,500 | 160 | 83.6 | 9.5 | 6.6 | 0.3 |
| 2[2a] | 3,000 | 150 | 91.7 | 6.4 | 1.6 | 0.3 |
| 3[2b] | 1,500 | 140 | 48.9 | 32.1 | 3.5 | 15.1 |
| 4[2a] | 1,500 | 120 | 98.3 | 1.5 | trace | 0 |
| 5[2a] | 1,500 | 120 | 30.4 | 49.4 | 0.1 | 20.1 |

[a] Girdler G–67 Co catalyst. [b] Girdler G–67A Ni catalyst.

EXAMPLE III

Preparation of 4-(aminomethyl)cyclohexanecarbonitrile was carried out in a batchwise manner by the following procedure: the following was charged to a rocker-type autoclave: 50 g. 1,4-cyclohexanedicarbonitrile, 50 g. anhydrous ammonia, 5 g. Raney nickel. Hydrogenation was accomplished at 110° C. and 1500 p.s.i. hydrogen.

Three components were isolated from the reaction by fractional distillation:

| | Parts |
|---|---|
| (1) 1,4-cyclohexanedicarbonitrile | 5 |
| (2) 1,4-cyclohexanebis(methylamine) | 70 |
| (3) 4-(aminomethyl)cyclohexanecarbonitrile | 25 |

4-(aminomethyl)cyclohexanecarbonitrile was confirmed by infrared, nuclear magnetic resonance and titration (consisted of cis and trans isomers), boiling point 89° C. at 0.9 mm., density—0.9810, refractive index—1.4820.

From the table presented with Example II, it is evident that our novel process is useful not only for producing 4-(aminomethyl)cyclohexanecarbonitrile, but also useful for the production of other valuable products such as 3-azabicyclo[3.2.2]nonane which is a useful intermediate in the preparation of certain pharmaceutical and other products and the production of 1,4-cyclohexane-bis(methylamine) which is useful as a valuable intermediate in the preparation of fiber-forming linear polyamides as described in U.S. patent to Bell, Smith and Kibler 3,012,994 and in U.S. patents to Caldwell 2,985,626; 2,985,627; and 2,985,628. Our novel compound, 4-(aminomethyl)cyclohexanecarbonitrile, is a valuable intermediate for the production of 4-(aminomethyl)cyclohexanecarboxylic acid to which compound it may be converted by hydrolysis by procedures well known to those skilled in the art and also illustrated by Example IV. This acid is an intermediate for the preparation of valuable fiber-forming linear polyamides as described in U.S. Patent 2,910,457 as well as for the preparation of various pesticides and other useful compounds.

EXAMPLE IV

To a 1-liter three-necked flask equipped with a stirrer, condenser, thermometer and dropping funnel was charged 185 g. (0.59 mole) of barium hydroxide octahydrate. The barium hydroxide octahydrate was heated with stirring to 90–95° C., and 69 g. (0.5 mole) of 4-(aminomethyl)cyclohexanecarbonitrile was added while the temperature was maintained at 90° C.±5° C. After the addition had been completed, the reaction mixture was refluxed for 15 hrs.; then heating was discontinued and 500 ml. of hot water was added to the reaction flask. The reaction mixture was then saturated with carbon dioxide, filtered, and the solid extracted with two 500-ml. portions of hot water. The first filtrates and water extracts were combined and concentrated in vacuo until 90 percent of the charge had been removed. The residue was taken up in 200 ml. of water, treated with a decolorizing charcoal sold under the trademark Darco G–60, and filtered hot. The filtrate was again concentrated in vacuo until 90 percent of the charge had been removed. Excess isopropyl alcohol was added to the residue and the resultant mixture was chilled overnight at 0° C. The solid was collected by filtration to yield 51.5 g. (65.6 percent of theory) of 4-(aminomethyl)cyclohexanecarboxylic acid which melted with decomposition at 200° C. or above.

Although the invention has been described in considerable detail with particular reference to certain preferred embodiments thereof, variations and modifications can be effected within the spirit and scope of the invention as described hereinabove, and as defined in the appended claim.

We claim:

1. 4-(aminomethyl)cyclohexanecarbonitrile.

References Cited

UNITED STATES PATENTS 3,100,205  8/1963  Schulte et al. _____ 260—464
3,143,570  8/1964  Caldwell et al. _____ 260—464

OTHER REFERENCES

Beilsteins Handbuch Der Organischen Chemie, Vierte Auflage, vol. 14, pp. 304–305 (Berlin, 1931). QD251 B4.

Hickinbottom: Reactions of Organic Compounds (London, 1948), p. 249. QD251 H6.

Migrdichian: Organic Synthesis, vol. 1 (New York, 1957), p. xxiii. QD262 M55.

ALTON D. ROLLINS, *Primary Examiner.*